United States Patent
Gupta et al.

(10) Patent No.: US 7,831,094 B2
(45) Date of Patent: Nov. 9, 2010

(54) SIMULTANEOUS LOCALIZATION AND MAPPING USING MULTIPLE VIEW FEATURE DESCRIPTORS

(75) Inventors: Rakesh Gupta, Mountain View, CA (US); Ming-Hsuan Yang, Mountain View, CA (US); Jason Meltzer, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 980 days.

(21) Appl. No.: 11/021,672

(22) Filed: Dec. 22, 2004

(65) Prior Publication Data

US 2005/0238200 A1    Oct. 27, 2005

Related U.S. Application Data

(60) Provisional application No. 60/565,991, filed on Apr. 27, 2004.

(51) Int. Cl.
G06K 9/46 (2006.01)
(52) U.S. Cl. .................... 382/190; 382/103
(58) Field of Classification Search .......... 382/190, 382/208
See application file for complete search history.

(56) References Cited

U.S. PATENT DOCUMENTS

| | | | | |
|---|---|---|---|---|
| 5,280,530 A | * | 1/1994 | Trew et al. | 382/103 |
| 5,363,305 A | * | 11/1994 | Cox et al. | 701/200 |
| 5,850,469 A | * | 12/1998 | Martin et al. | 382/154 |
| 6,678,413 B1 | * | 1/2004 | Liang et al. | 382/181 |
| 6,683,677 B2 | * | 1/2004 | Chon et al. | 356/28 |
| 7,130,446 B2 | * | 10/2006 | Rui et al. | 382/103 |

FOREIGN PATENT DOCUMENTS

| | | |
|---|---|---|
| JP | H06-187033 | 7/1994 |
| JP | H09-53939 | 2/1997 |

OTHER PUBLICATIONS

PCT International Search Report and Written Opinion, PCT US2005/14365, Jul. 23, 2008.
Japanese Patent Office Non-Final Office Action, Japanese Patent Application No. P2007-510911, Aug. 6, 2010, 4 pages.

* cited by examiner

*Primary Examiner*—Brian Q Le
*Assistant Examiner*—Edward Park
(74) *Attorney, Agent, or Firm*—Fenwick & West LLP; Mark E. Duell

(57) ABSTRACT

Simultaneous localization and mapping (SLAM) utilizes multiple view feature descriptors to robustly determine location despite appearance changes that would stifle conventional systems. A SLAM algorithm generates a feature descriptor for a scene from different perspectives using kernel principal component analysis (KPCA). When the SLAM module subsequently receives a recognition image after a wide baseline change, it can refer to correspondences from the feature descriptor to continue map building and/or determine location. Appearance variations can result from, for example, a change in illumination, partial occlusion, a change in scale, a change in orientation, change in distance, warping, and the like. After an appearance variation, a structure-from-motion module uses feature descriptors to reorient itself and continue map building using an extended Kalman Filter. Through the use of a database of comprehensive feature descriptors, the SLAM module is also able to refine a position estimation despite appearance variations.

45 Claims, 5 Drawing Sheets

US 7,831,094 B2

SIMULTANEOUS LOCALIZATION AND MAPPING USING MULTIPLE VIEW FEATURE DESCRIPTORS

BACKGROUND OF THE INVENTION

This application claims priority under 35 USC §119(e) to U.S. Provisional Patent Application No. 60/565,991 filed on Apr. 27, 2004, titled "Simultaneous Localization and Mapping Using Multiple View Feature Descriptors," the content of which is incorporated by reference herein in its entirety.

BACKGROUND OF THE INVENTION

1. Field of the Invention

This invention relates generally to image processing, and more specifically, to generating multi-view feature descriptors of scenes from a video stream for subsequent mapping and determining a location within the map after an appearance variation.

2. Description of Related Art

Computer vision is a giant step in computer intelligence that provides a myriad of new capabilities. For example, the ability of a computer to determine its current location while attached to a robot or other mobile vehicle allows the robot to autonomously interact with its environment. To update location during motion, some computers use odometry techniques to measure how far and in which direction the robot has traveled from a known location. However, such measurements are only valid through uninterrupted travel, and drift significantly over time. A 'kidnapped' robot is moved from one position to another without any information about its new location. Because the robot is unable to reorient itself without any odometry information, it can no longer provide accurate localization. Thus, some computers use image processing techniques to recognize the new location from training data, and thus estimate position.

Problematically, conventional image processing techniques use a single view of a scene to gather training data. More particularly, these conventional systems use two-dimensional (2-D) images of a three-dimensional (3-D) scene during training to gather information for pattern matching during recognition. But the 3-D scene has different appearances in 2-D images depending on various factors such as which viewpoint the image is captured, illumination, occlusion, and the like. Consequentially, a conventional system with training data of a scene with one appearance has difficulty in recognizing the same scene through an appearance variation. Even systems that allow some variability are limited to small baseline changes and will thus fail in response to wide baseline changes. Generally, small baseline changes are slight variations such as an offset of a few degrees or a slightly different scale, whereas large baseline changes, in extreme, can be a 180-degree variation or a doubling in size.

Unfortunately, conventional image processing techniques cannot support applications such as Simultaneous Localization and Mapping (SLAM) without accurate position information. A robot performs SLAM to build a map of unknown surroundings while determining its location within the surroundings. If position data is not available, the robot can no longer perform position-dependent interactive or autonomous actions such as navigation. Additionally, the robot cannot continue building a unified map of the surroundings.

Therefore, what is needed is a robust image processing system that uses multiple view feature descriptors for recognition in applications such as SLAM. Furthermore, the system should use video data already available during SLAM operations to generate the feature descriptors with sparse data.

SUMMARY OF THE INVENTION

The present invention meets these needs with systems, methods and computer products for simultaneous localization and mapping (SLAM) using multiple view feature descriptors. The system continues to perform SLAM operations despite appearance changes that would stifle prior art systems. Advantageously, this system can efficiently build necessary feature descriptors using data already available during localization and/or mapping for training.

In one embodiment, a SLAM module receives a video stream from a camera for building up a map within an unknown environment while, at the same time, keeping track of its current position within the map. Based on the video stream, the SLAM module generates a feature descriptor for a scene from different perspectives. The feature descriptor comprises information from a collection of small baseline changes of tracked points, the changes stemming from camera motion or changes in the object's appearance.

When the SLAM module subsequently receives a recognition image after a wide baseline change, it can refer to correspondences from the feature descriptor to continue map building and/or determine location. These appearance variations can result from, for example, a change in illumination, a change in scale, a change in orientation, change in distance, partial occlusion, geometric change (e.g., warping), and the like. In one example, a 'kidnapped' robot that is manually moved from one location to another location, amounting to a wide baseline change, is able to determine its new location from feature descriptors.

The SLAM module first has to build feature descriptors. In one embodiment, a feature tracking module in the SLAM module determines which points to track in individual images of the video stream. The feature tracking module generates image patches based on the tracked points. Since the features have small baseline changes between individual images, the feature tracking module is able to reliably correspond tracked points despite appearance variations. A description of this can be found in J. Shi and C. Tomasi, "Good Features to Track," IEEE CVPR, 1994. In still another embodiment, a feature description module in the SLAM module generates a feature descriptor including a multi-view image description of these tracked points. Each small baseline change within the video stream can be added to a single feature descriptor to yield a richer representation using, for example, kernel principal component analysis (KPCA). One embodiment efficiently develops feature descriptors using approximate KPCA to reduce computational complexity and output sparser data. A description of this can be found in J. Meltzer, M. H. Yang, R. Gupta and S. Soatto, "Multiple View Feature Descriptors from Image Sequences via Kernel Principal Component Analysis," European Conference on Computer Vision (ECCV), May 11-14, 2004, Prague, Czech Republic.

The SLAM module maps and localizes itself using feature descriptors. In one embodiment, a structure-from-motion module develops a three-dimensional (3-D) map from the two-dimensional (2-D) images of the video stream using, for example, an extended Kalman Filter. A description of this is given in A. Chiuso, P. Favaro, H. Jin and S. Soatto, "Structure from Motion Causally Integrated over Time," IEEE Transactions on Pattern Analysis and Machine Intelligence, Volume 24, No 4, April 2002. After an appearance variation, the structure-from-motion module uses feature descriptors to reorient itself and continue map building. In another embodiment, the structure-from-motion module uses the feature descriptors as generic landmarks for estimating location. By having a database of comprehensive feature descriptors, the structure-from-motion module is able to adjust its position estimation based on known positions of the feature descriptors despite appearance variations.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE PREFERRED EMBODIMENTS

Systems, methods and computer products for simultaneous localization and mapping (SLAM) using multiple view feature descriptors are disclosed. Some embodiments of the system are set forth in FIGS. 1-2, and some embodiments of the method operating therein are set forth in FIGS. 3-5. The accompanying description is for the purpose of providing a thorough explanation with numerous specific details. Of course, the fields of image processing and SLAM are such that many different variations of the illustrated and described features of the invention are possible. Those skilled in the art will thus undoubtedly appreciate that the invention can be practiced without some specific details described below, and indeed will see that many other variations and embodiments of the invention can be practiced while still satisfying its teachings and spirit. Accordingly, the present invention should not be understood as being limited to the specific implementations described below, but only by the claims that follow.

The processes, features, or functions of the present invention can be implemented by program instructions that execute in an appropriate computing device described below. The program instructions can be distributed on a computer readable medium, within a semiconductor device, or through a public network. Program instructions can be in any appropriate form, such as source code, object code, or scripts.

Figure 1:
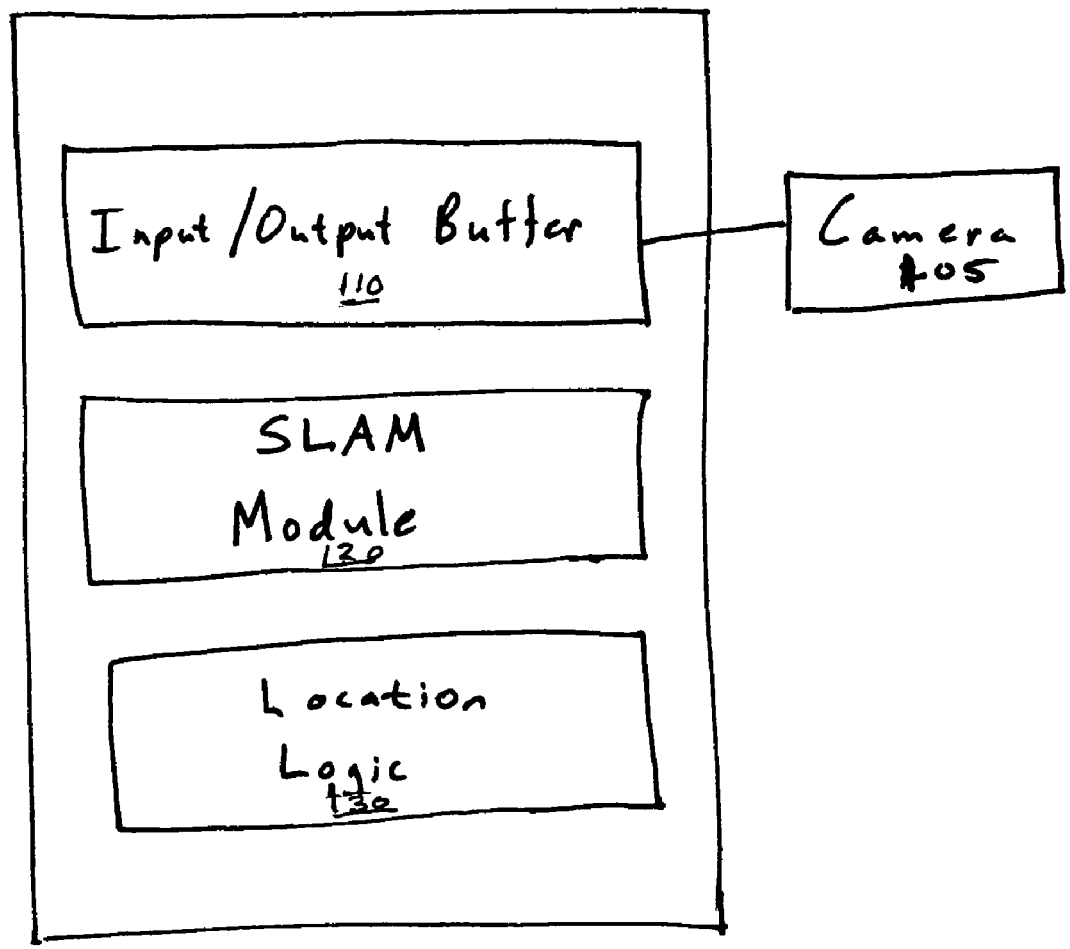
FIG. 1 is a block diagram illustrating a simultaneous localization and mapping (SLAM) system according to one embodiment of the present invention.

FIG. 1 is a block diagram illustrating a SLAM system 100 according to one embodiment of the present invention. The system 100 comprises, for example, a mobile robot, an automobile, an autonomous device, a personal computer, or any computing environment. In the mobile robot example, the system 100 can train itself by building up a map by roaming around an unknown environment while, at the same time, keeping track of its current position within the map. A 'kidnapped' robot occurs when the robot is moved from one location to another. In this event, the system 100 uses feature descriptors from training to determine its new location and can continue mapping. The system 100 can comprise traditional computing components such as a processor, a memory, and data storage coupled to a bus. In one embodiment, the computing components have limited processing and/or storage resources.

In the example system 100 of FIG. 1, a camera 205 inputs a video stream of its surroundings. The camera 105 can provide monocular or stereo views. The camera 105 is, for example, a robot eye, a verification camera, a surveillance camera, or any camera capable of generating the sequence of images. The video stream is input to an input/output buffer 110 for storage during image processing. The input/output buffer 110 can be any memory device or portion thereof such as a RAM, a hard drive, a flash memory, and the like. A SLAM module 120 performs localization to determine the system's 100 location and/or mapping to build a three-dimensional (3-D) model of the scene. Depending on a particular application, a location logic 130 makes location-based decisions. For example, the location logic 130 can stop motion in response to the system 100 approaching a ledge, or can perform other interactive and/or autonomous actions.

Figure 5A:
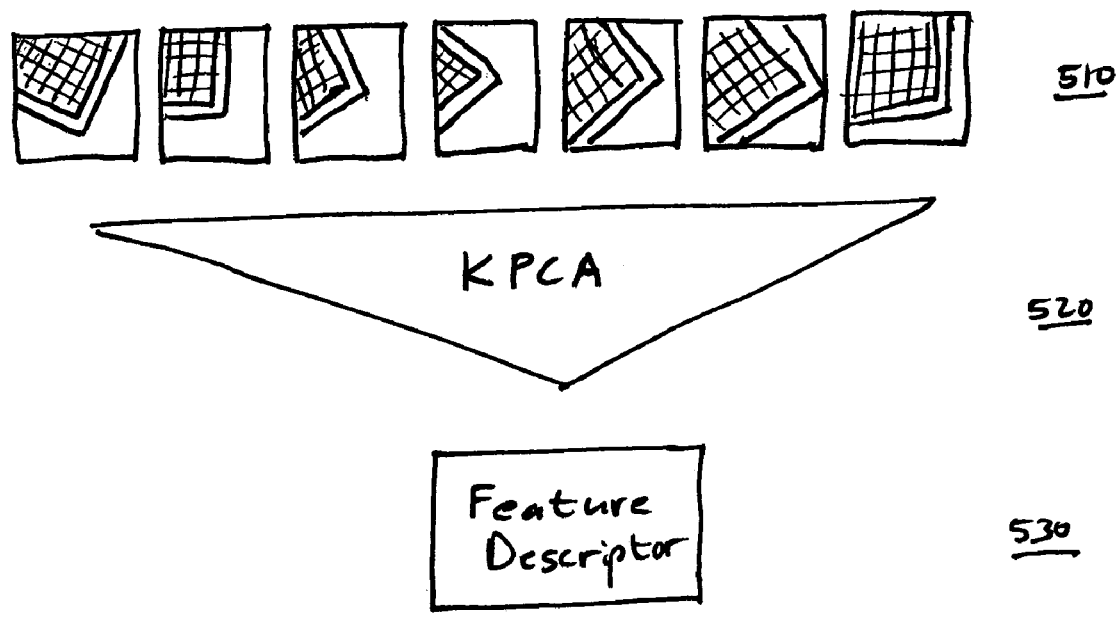
FIGS. 5A-B illustrate an exemplary video stream containing both small baseline changes and wide baseline changes.

In one embodiment, the SLAM module 120 generates a multiple view feature descriptor for an image's scene based on multiple images in the input video stream (see FIG. 5A). The feature descriptor comprises a collection of small baseline changes of tracked points stemming from camera motion and/or changes in the object's appearance. When the SLAM module 120 subsequently receives a recognition image after a wide baseline change (see FIG. 5B), the SLAM module 120 can refer to the feature descriptor to determine its location and continue map building. By contrast, conventional techniques using single view descriptors have to generate a new descriptor due to variations such as a view direction change greater than 20 degrees or less. Consequently, these systems are unable to recognize the same scene after variations of similar or greater magnitude.

Figure 2:
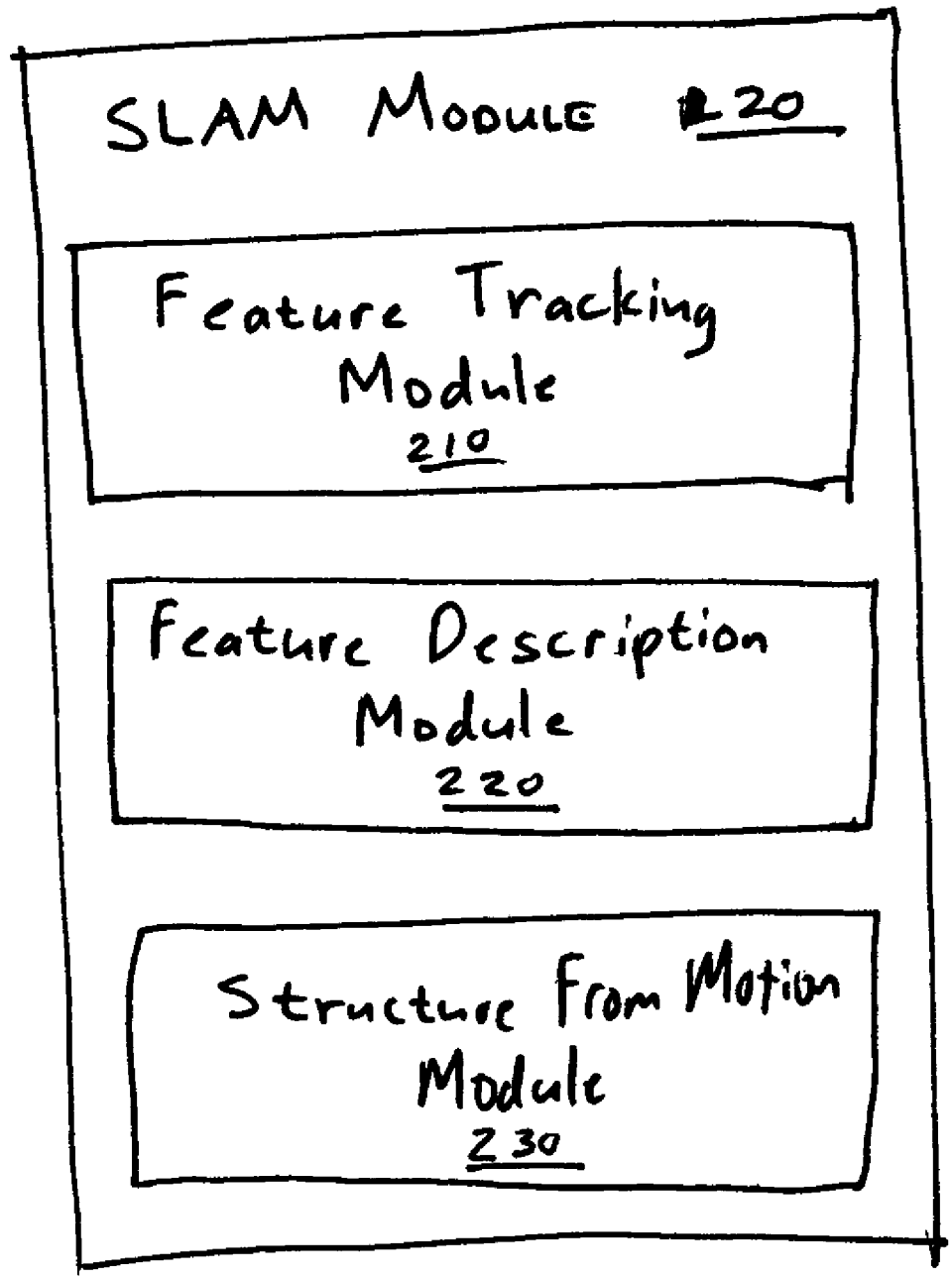
FIG. 2 is a block diagram illustrating a SLAM module according to one embodiment of the present invention.

FIG. 2 is a block diagram illustrating a SLAM module 120 according to one embodiment of the present invention. The SLAM module 120 efficiently generates feature descriptors from data already available during localization and map building. Instead of discarding this data like conventional systems, the SLAM module 120 improves system 100 performance by continually enhancing feature descriptors with additional views.

In one embodiment, a feature tracking module 210 in the SLAM module 120 determines which points to track in individual images of the video stream. The feature tracking module 210 generates image patches based on the tracked points. Since the features have small baseline changes between individual images, the feature tracking module 210 is able to reliably correlate tracked points. Generally, small baseline changes are slight variations such as an offset of a few degrees or slightly different scale, whereas large baseline changes can range from just over a small baseline change to an angle variation up to 180 degrees. The feature tracking module 210 can be an affine-invariant tracker such as a Shi-Tomasi tracker, a translation-invariant tracker such as a Lucas-Kanade tracker, or any other consistent feature selector and tracker that can estimate candidate points. A citation for the Shi-Tomasi tracker was given above, and a discussion of the Lucas-Kanade tracker can be found in C. Tomasi, T. Kanade, "Detection and tracking of point features," Tech. Rept. CMU- CS-91132. Pittsburgh: Carnegie Mellon U. School of Computer Science, 1991, which is incorporated by reference herein in its entirety. In one embodiment, rather than using a feature tracking module 210, the SLAM module 120 analyzes images using other methods such as odometry.

In another embodiment, a feature description module 220 in the SLAM module 120 generates and/or enhances a feature descriptor including a multiple view image description of the tracked points. The feature description module 220 matches image patches within a new image to existing descriptors. Each small baseline change can be added to a single feature descriptor to yield a richer representation using, for example, kernel principal component analysis (KPCA) in high dimensional space. Generally, KPCA is a kernalized version of PCA that provides non-linear feature extraction. Classifiers or linear functions can be applied to data that has been mapped from an input space to a feature space, F.

In one embodiment, a structure-from-motion module 230 develops a 3-D map from the 2-D images of the video stream using, for example, an extended Kalman Filter. The mapping can include position information for feature descriptors. After an appearance variation, the structure-from-motion module 230 uses feature descriptors to reorient itself and continue map building. In another embodiment, the structure-from-motion module 230 uses the feature descriptors as generic landmarks for estimating location. By having a database of comprehensive feature descriptors, the structure-from-motion module 230 is able to adjust its position estimation based on known positions of the feature descriptors despite appearance variations. Note that although some embodiments are described for use in a system 100 configured for SLAM, other embodiments perform localization and mapping that are not simultaneous, or are only a subset of SLAM operations or other location-based applications.

Figure 3:
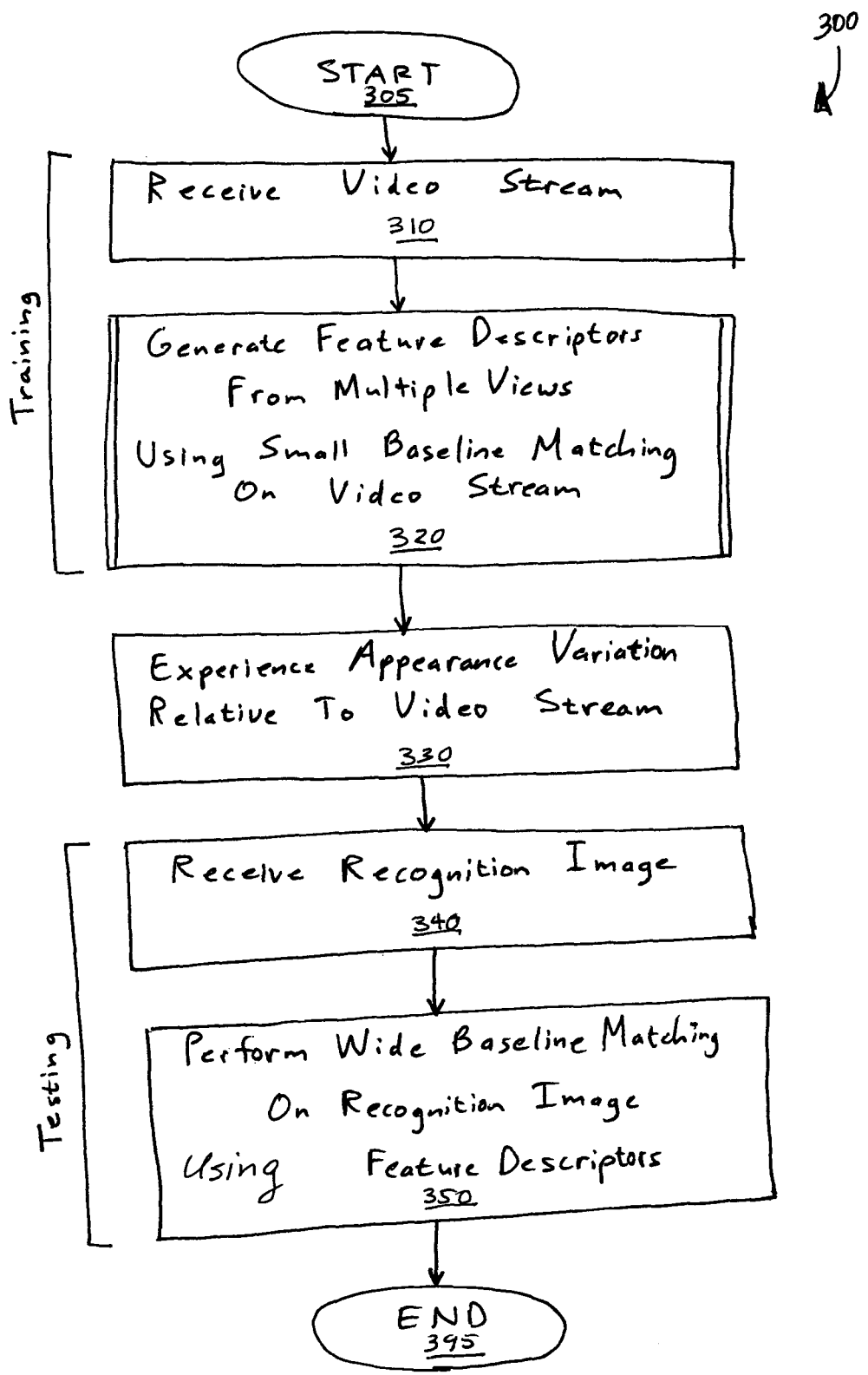
FIG. 3 is a flow chart illustrating a method of SLAM according to one embodiment of the present invention.

FIG. 3 is a flow chart illustrating a method 300 of SLAM according to one embodiment of the present invention. At a high-level, the system 100 preferably operates in two modes: training 310, 320, and testing 340, 350. During the training mode, the system 100 collects data for localizing and map building, and uses the same data to generate feature descriptors from a first video stream, and during the testing mode, the system 100 finds correspondence between the first video stream and a given image from the feature descriptors so that the system 100 can continue localizing and map building (e.g., between FIG. 5A and FIG. 5B as discussed below). Note however, that the system 100 can be provided with preexisting data for testing, which substitutes for self-obtained data from the training phase. In one embodiment, the location logic 130 performs an additional set of actions responsive to a position as described above.

The input/output buffer 210 receives 310 an input video stream from the camera 105. In one embodiment, the system 100 preprocesses the video stream to adjust for size, color, or any other characteristics beneficial for processing. The video stream contains a sequence of images capturing scenes around the system 100. In one embodiment, the camera 105 is mobile, or it is attached to a mobile platform. As a result, the images have incremental variations such as scale or orientation, consistent with the motion. Additionally, frames can vary by illumination, occlusion, warping, or a variety of other appearance changes separate from the motion. Preferably, a rate of the video stream (e.g., 30 feet per second, fps, or 60 fps) contains inter-frame variations that are small enough for successful tracking. A resolution of the video stream can vary according to processing power or desired system performance.

Figure 4:
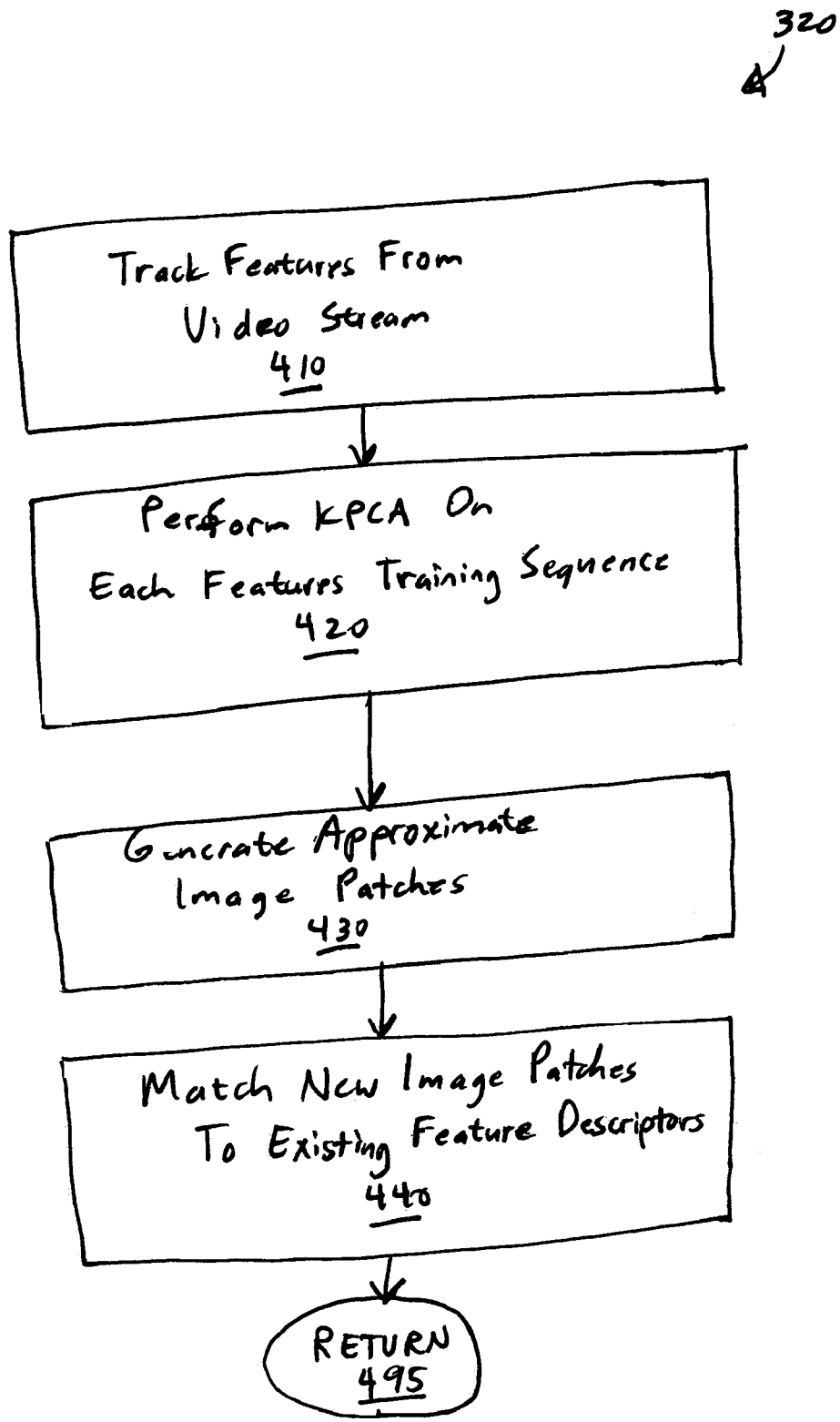
FIG. 4 is a flow chart illustrating a method of generating feature descriptors according to one embodiment of the present invention.

The SLAM module 120 generates 320 feature descriptors from multiple views using small baseline matching on the video stream. The detailed flow chart of FIG. 4 illustrates a method 320 of generating feature descriptors using small baseline matching according to one embodiment of the present invention. Generally, the feature description module 220 extracts features from an image for matching to existing feature descriptors.

In FIG. 4, the feature tracking module 210 tracks 410 features from the input video stream. In a single image, the feature tracking module 210 can find image locations that may be reliably detected by searching for extrema in the scale space of the images, then compared to adjacent images to find local point correspondences. For example, a scale invariant feature transform considers an isotropic Gaussian scale space, searching for extrema over scale in a one-dimensional scale space. A difference-of-Gaussian function is convolved with the image, computed by taking the difference of adjacent Gaussian-smoothed images in a scale space pyramid. Once extrema are located by finding maxima and minima in neighborhoods of the scale space pyramid, they are filtered for stability and assigned a canonical orientation, scale and a descriptor derived from gradient orientations in a local window.

The feature tracking module 210 performs 420 KPCA using a kernel (e.g. a Gaussian kernel) on each feature's training sequence or reduced training set from the approximate KPCA discussed below. In one embodiment, the feature description module 220 uses KPCA to generate feature descriptors in high dimensional space, F, related to the input by the nonlinear map $\Phi:R^N \to F$. If $y \in R^N$ is a vectorized image patch, $Y \in F$ is the image patch mapped into F.

The covariance matrix for F is $$C' = \frac{1}{M} \sum_{i,j=1}^{M} \Phi(y_i)\Phi(y_j)^T$$

assuming $$\sum_{k=1}^{M} \Phi(y_k) = 0$$

where M is the number of image patches. And C' is the covariance matrix of the project samples in the feature space F. By diagonolizing C', a basis of kernel principal components (KPCs) is found. Using an appropriate kernel function $\langle \Phi(x), \Phi(y) \rangle, x, y \in R^N$, it is not necessary to compute the inner product in the high-dimensional space F. The KPCs are implicitly represented in terms of the inputs (image patches) y, the kernel k, and a set of linear coefficients β as $$\Psi = \sum_{i=1}^{M} \beta_i \Phi(y_i), \Psi \in F.$$

Consequentially, KPCA overcomes the shortcomings of PCA which does not perform well for data points generated from a nonlinear manifold, and ignores higher-order statistics including nonlinear relations among pixels in an edge or a curve.

The feature tracking module 210 approximates 430 image patches from an original basis of each feature. In one embodiment, approximate KPCA advantageously reduces the computational complexity while yielding a compact representation. Rather than storing all of the input vectors (image patches) in order to perform classification, approximate KPCA produces a fixed number of image patches along with expansion coefficients and a kernel function for a compact representation of high-dimensional space. Given a vector $\Psi$ in space F, the system seeks an approximation $$\Psi^* = \sum_{i=1}^{L} \beta_i \Phi(z_i).$$

It is sufficient to minimize the distance between $\Psi$ and its projection onto $\Phi(z)$, or in other words maximizing $$\frac{\langle \Psi, \Phi(z) \rangle^2}{\langle \Phi(z), \Phi(z) \rangle}.$$

This can be accomplished for the selected Gaussian kernel in an iterative way using $$z^{n+1} = \frac{\langle Y, (\alpha \cdot * K^n) \rangle}{\alpha^T K^n}.$$

The feature tracking module 120 forms an approximate basis for each feature by finding approximate patches which lead to the least residual estimate of the original basis in high-dimensional space. Next, the feature description module 220 matches 440 approximate image patches to existing feature descriptors. Given a patch from an example image, y, and a learned descriptor basis $\psi_i$, the system can determine a match if the distance measure $$\left\| \Phi(y) - \sum_{i=1}^{N} \frac{\langle \Phi(y), \psi_i \rangle}{\langle \psi_i, \psi_i \rangle} \psi_i \right\|^2$$

is below a threshold value. Since this expression can be written solely in terms of inner products, the kernel function can be used to calculate the match score. Thus, the feature description module 220 learns variability in images directly from data in the video stream rather than deriving invariance indirectly from a model.

Figure 5B:

Referring again to FIG. 3, under ordinary operation, the system 100 continues map building according to the training phase. However, in some situations, the scene experiences 330 an appearance variation. In the 'kidnapped' robot example, where the robot is moved to a new location, objects can experience scale or orientation changes (axis rotation). For example, the camera 1F05 can transition from viewing a cube's left oriented face to viewing the cube's right oriented face at half the distance. The illustrations of FIGS. 5A-B show an exemplary video stream containing a feature 510 experiencing small baseline changes. Using KPCA 520, a feature descriptor 530 is developed from small baseline changes as described above. However, the recognition image 540 shows the same feature after a wide baseline change. In another example, a moving object can occlude, or partially block, an object. In yet another example, a room light turned on or off can change an object's illumination. In still another example, the object itself can change, for example, by warping. In one embodiment, wide baseline appearance variation comprises a change significant enough to interrupt the feature tracking module 210 from tracking desired points (e.g., a 20 degree view direction change).

Appearance variations affect both the domain of the image (geometric distortion due to changes of the viewpoint and/or deformations in the scene) and its range (changes in illumination, deviation from Lamertian reflection). A feature is a statistic of the image, $\Phi: I \rightarrow R^k$ is designed to facilitate the correspondence process. Preferably, the feature statistic is invariant with respect to nuisance factor, e.g., image noise, as discussed in Vladimir N. Vapnik, Statistical Learning Theory, Chapter 6, John Wiley and Sons, 1998, which is incorporated herein in its entirety. That is, the problem involves a large set of training images rather than a single one to accommodate possible variation in appearance, e.g., under different lighting conditions, view angels, deformation, etc. This may not be possible in invariant single view statistics, even for Lambertian scenes. Correspondence relies on an underlying model of the scene. A constellation of planar patches supports a radiance density which obeys a diffuse and specular reflection module. The rank of an aggregation of corresponding views is limited for patches that are small enough to see the Lambertian albedo, or a reflection of the light source. This is discussed in Computer Vision: A Modern Approach, by David Forsyth and Jean Ponce, Prentice Hall, 2003, which is incorporated herein in its entirety. The multiple view descriptor can be represented by a rank-constraint in a suitable inner product of a deformed version of the image.

Referring again to FIG. 3, in the testing phase, the SLAM module 120 receives 340 a recognition image. The recognition image contains an appearance variation amounting to a wide baseline change relative to the immediately preceding video stream.

The feature description module 220 performs 350 wide baseline matching on a recognition image to existing feature descriptors. To do so, the feature tracking module 210 uses above discussed methods to find initial features. In affine tracking, the feature description module 220 performs affine warping in a neighborhood around each candidate point, seeking to minimize any discrepancy between the patch surrounding this point and descriptors stored in the training phase. Image patches falling below a threshold distance are selected as candidates for matching. Given the set of candidate wide baseline correspondences, the system can localize using standard techniques for finding the Fundamental or Essential Matrix describing the rigid transformation which maps the current coordinates of the camera to that of the original reference frame used in the training phase. This is discussed in P. H. S. Torr and A. Zisserman. MLESAC: A New Robust Estimator with Application to Estimating Image Geometry, Journal of Computer Vision and Image Understanding, 2000, which is incorporated herein in its entirety.

The above description is included to illustrate the operation of the preferred embodiments and is not meant to limit the scope of the invention. The scope of the invention is to instead be limited only by the following claims.

We claim:

1. A method for simultaneous localization and mapping of a position of a camera, comprising the steps of:
   receiving a sequence of images from the camera having an incremental baseline change between two images, the sequence of images describing a three-dimensional environment surrounding the camera;

generating, using a feature tracking module included in a computing device, one or more training feature descriptors using an approximate Kernel Principal Analysis (KPCA), a training feature descriptor based on the incremental baseline change between the two images in the sequence of images received from the camera, and the training feature vector associated with position information describing a location of an object within the three dimensional environment relative to the camera;

creating, using a structure-from-motion module included in the computing device, a three-dimensional map of the three dimensional environment captured by the sequence of images using an extended Kalman Filter, and the one or more training feature descriptors, the map including position information associated with one or more training feature descriptors describing locations of one or more objects within the three dimensional environment relative to the camera;

receiving a recognition image containing a wide baseline appearance variation relative to at least a last image from the sequence of images;

extracting a recognition feature descriptor from the recognition image using the feature tracking module; and determining a position of the camera within the three-dimensional map, using the feature tracking module, by matching the recognition feature descriptor to a training feature descriptor from the one or more training feature descriptors and identifying a position information associated with the training feature descriptor from the one or more training feature descriptors which describes a location of an identified object within the three dimensional environment relative to the camera.

2. The method of claim 1, wherein said generating a training feature descriptor further comprises:
selecting a tracking feature from a plurality of tracking points derived from the sequence of images; and
matching the tracking points over the sequence of images.

3. The method of claim 2, wherein the step of selecting the tracking feature comprises:
selecting the tracking feature using an affine invariant tracker.

4. The method of claim 2, wherein the step of generating the training feature descriptor comprises:
building the training feature descriptor from the tracking feature using approximate Kernel Principal Component Analysis.

5. The method of claim 1, wherein the step of creating a map comprises:
generating a three-dimensional map using an extended Kalman Filter.

6. The method of claim 1, further comprising:
storing the training feature descriptor.

7. The method of claim 1, wherein the step of matching the recognition feature descriptor to the training feature descriptor comprises:
matching the recognition feature descriptor to the training feature descriptor through wide baseline correspondences.

8. The method of claim 1, wherein the two images of the sequence of images exhibit small baseline viewpoint changes.

9. The method of claim 1, wherein the step of matching the recognition feature descriptor to the training feature descriptor comprises:

projecting the recognition feature descriptor onto the training feature descriptor;
determining a projection distance; and
determining whether the projection distance falls below a threshold.

10. The method of claim 1, further comprising:
estimating a current position of the camera based on an initial position and a distance traveled; and
adjusting said estimation for drift based on a difference between the training feature descriptor and the recognition feature descriptor.

11. The method of claim 1, wherein the appearance variation comprises at least one from the group containing a viewpoint variation, an illumination variation, a scale variation, a geometry variation and an occlusion.

12. The method of claim 1, further comprising the step of receiving an initial position.

13. The method of claim 1, further comprising the step of updating the map of the environment.

14. The method of claim 1, wherein the camera is included in a camera-based computing system.

15. The method of claim 14, wherein the camera-based computing system comprises a robot.

16. The method of claim 1, wherein the camera is included in a camera based computing system.

17. The method of claim 16, wherein the camera-based computing system comprises a robot.

18. The method of claim 1, wherein the two images comprise consecutive images.

19. A system for determining a position of a camera using wide baseline matching, comprising:
means for tracking within a sequence of images received from the camera having an incremental baseline change between two images, the sequence of images describing a three-dimensional environment surrounding the camera;
means for receiving a recognition image from the camera and extracting a recognition feature descriptor from the recognition image;
means for describing coupled to the means for tracking, the means for describing to generate one or more training feature descriptors using an approximate Kernel Principal Analysis (KPCA), a training feature descriptor based on the incremental baseline change between the two images in the sequence of images received from the camera and the training feature vector associated with position information describing a location of an object within the three dimensional environment relative to the camera;
means for mapping a scene from the recognition image, coupled to the means for tracking and the means for matching, the means for mapping to create a three dimensional map of the three dimensional environment captured by the sequence of images using an extended Kalman Filter and the one or more training feature descriptors, said three dimensional map including position information associated with one or more feature vectors describing locations of one or more objects within the three dimensional environment relative to the camera;
means for matching coupled to the means for tracking, the means for matching to match the recognition feature descriptor to a training feature descriptor from the one or more training feature descriptors and identifying a position information associated with the training feature descriptor from the one or more training feature descriptors which describes a location of an identified object within the three dimensional environment relative to the camera; and means for positioning, coupled to the means for mapping and the means for matching, the means for positioning to determine a position of the camera within the three dimensional map, and responsive to the appearance variation within the recognition image.

20. The system of claim 19, wherein the means for tracking selects a tracking feature based on a plurality of tracking points from the sequence of images, and matches the tracking points among one or more of the sequence of images.

21. The system of claim 20, wherein the means for tracking selects the tracking feature using an affine invariant tracker.

22. The system of claim 19, wherein the means for describing stores the training feature descriptor.

23. The system of claim 19, wherein the means for matching matches the recognition feature descriptor to the training feature descriptor through wide baseline correspondences.

24. The system of claim 19, wherein an image contains a small baseline viewpoint change with respect to a preceding image.

25. The system of claim 19, wherein the means for matching projects the recognition feature descriptor onto the training feature descriptor, determines a projection distance, and determines whether the projection distance falls below a threshold.

26. The system of claim 19, wherein the means for positioning estimates a current position of the camera based on an initial position and a distance traveled, and adjusts said estimate for drift based on a difference between the training feature descriptor and the recognition feature descriptor.

27. The system of claim 19, wherein the appearance variation comprises at least one from the group containing: a viewpoint variation, an illumination variation, a scale variation, a geometry variation and an occlusion.

28. The system of claim 19, wherein the means for positioning receives an initial position of the camera.

29. The system of claim 19, wherein the camera is included in a camera-based computing system.

30. The system of claim 29, wherein the camera-based computing system comprises a robot.

31. The system of claim 19, wherein the two images comprise consecutive images.

32. A computer program product, comprising a non-transitory computer-readable storage medium having computer program instructions and data embodied thereon for implementing a method for determining a position of a camera using wide baseline matching, the method comprising the steps of:

receiving a sequence of images from the camera wherein there is an incremental change between two images, the sequence of images describing a three dimensional environment surrounding the camera;

generating one or more training feature descriptors using an approximate Kernel Principal Analysis (KPCA), a training feature descriptor based on the incremental change between the two images in the sequence of images received from the camera and a training feature vector associated with position information describing a location of an object within the three dimensional environment relative to the camera;

creating a three dimensional map of the three dimensional environment captured by the sequence of images using an extended Kalman Filter and the one or more training feature descriptors, the three dimensional map including position information associated with one or more training feature descriptors describing locations of one or more objects within the three dimensional environment relative to the camera;

receiving a recognition image containing an appearance variation relative to at least a last image from the sequence of images;

extracting a recognition feature descriptor from the recognition image; and determining a position of the camera within the map by matching the recognition feature descriptor to the training feature descriptor from the one or more training feature descriptors and identifying a position information associated with the training feature descriptor from the one or more training feature descriptors which describes a location of an identified object within the three dimensional environment relative to the camera.

33. The computer program product of claim 32, wherein said step of generating a training feature descriptor further comprises:

selecting a tracking feature from a plurality of tracking points derived from the sequence of images; and matching the tracking points over the sequence of images.

34. The computer program product of claim 33, wherein the step of selecting the tracking feature comprises selecting the tracking feature using an affine invariant tracker.

35. The computer program product of claim 32, further comprising the step of storing the training feature descriptor.

36. The computer program product of claim 32, wherein the step of matching the recognition feature descriptor to the training feature descriptor comprises matching the recognition feature descriptor to the training feature descriptor through wide baseline correspondences.

37. The computer program product of claim 32, wherein the two images of the sequence of images exhibit small baseline viewpoint changes.

38. The computer program product of claim 32, wherein the step of matching the recognition feature descriptor to the training feature descriptor comprises:

projecting the recognition feature descriptor onto the training feature descriptor;

determining a projection distance; and determining whether the projection distance falls below a threshold.

39. The computer program product of claim 32, further comprising:

estimating a current position of the camera based on an initial position and a distance traveled; and adjusting said estimate for motion drift based on a difference between the training feature descriptor and the recognition feature descriptor.

40. The computer program product of claim 32, wherein the appearance variation comprises at least one from the group containing: a viewpoint variation, an illumination variation, a scale variation, a geometry variation, and an occlusion.

41. The computer program product of claim 32, further comprising the step of receiving an initial position.

42. The computer program product of claim 32, further comprising the step of updating the map of the environment.

43. The computer program product of claim 32, wherein the camera is included in a camera-based computing system.

44. The computer program product of claim 43, wherein the camera-based computing system comprises a robot.

45. The computer program product of claim 32, wherein the two images comprise consecutive images.

* * * * *